United States Patent
Windle et al.

(10) Patent No.: US 10,742,412 B2
(45) Date of Patent: Aug. 11, 2020

(54) SEPARATE CRYPTOGRAPHIC KEYS FOR MULTIPLE MODES

(71) Applicant: EntIT Software LLC, Sunnyvale, CA (US)

(72) Inventors: Chris A. Windle, Sunnyvale, CA (US); Susan K. Langford, Sunnyvale, CA (US); John Martin Lewis, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 332 days.

(21) Appl. No.: 15/882,952

(22) Filed: Jan. 29, 2018

(65) Prior Publication Data

US 2020/0028683 A1     Jan. 23, 2020

(51) Int. Cl.
*H04L 9/16*     (2006.01)
*H04L 9/08*     (2006.01)

(52) U.S. Cl.
CPC ............... *H04L 9/16* (2013.01); *H04L 9/088* (2013.01); *H04L 9/0897* (2013.01)

(58) Field of Classification Search
CPC ......... H04L 9/16; H04L 9/088; H04L 9/0897; G06F 21/53
See application file for complete search history.

(56) References Cited

U.S. PATENT DOCUMENTS

| | | | |
|---|---|---|---|
| 8,675,875 B2 | 3/2014 | Yellepeddy et al. | |
| 9,525,672 B2 | 12/2016 | Cignetti et al. | |
| 9,571,279 B2 | 2/2017 | Kancharla et al. | |
| 2006/0014490 A1* | 1/2006 | Kopra | H04H 20/18 455/3.05 |
| 2006/0090084 A1* | 4/2006 | Buer | G06F 21/53 713/189 |
| 2008/0208758 A1* | 8/2008 | Spiker | G06F 21/83 705/70 |
| 2013/0003966 A1 | 1/2013 | Ihle et al. | |
| 2014/0229619 A1* | 8/2014 | Han | H04L 67/02 709/225 |

(Continued)

FOREIGN PATENT DOCUMENTS

WO    WO2016099644 A1    6/2016

OTHER PUBLICATIONS

Gemalto Solutions, "Hardware Security Modules (HSMs)", 2016-2017, 10 pages https://safenet.gemalto.com/data-encryption/hardware-security-modules-hsms/.

(Continued)

*Primary Examiner* — Nelson S. Giddins

(57) ABSTRACT

According to examples, an apparatus may include a security enclosure, a main processor housed in the security enclosure, and a physical security monitoring control unit (PSMCU) processor housed in the security enclosure. The PSMCU processor may cause the apparatus to switchably operate between a first mode and a second mode. In the first mode, the PSMCU processor may allow access by the main processor to a first cryptographic key while preventing access by the main processor to a second cryptographic key. In addition, in the second mode, the PSMCU processor may allow access by the main processor to the second cryptographic key while preventing access by the main processor to the first cryptographic key.

20 Claims, 7 Drawing Sheets

(56) References Cited

U.S. PATENT DOCUMENTS

2014/0324698 A1* 10/2014 Dolcino ............. G06Q 20/3227
                                                                        705/44
2018/0247084 A1* 8/2018 Smith .................. H04L 9/3236
2019/0295060 A1* 9/2019 Patwardhan ......... G06Q 20/202

OTHER PUBLICATIONS

Townsend Security, "The Definitive Guide to Encryption Key Management Fundamentals", downloaded on Aug. 24, 2017, 23 pages. https://info.townsendsecurity.com/definitive-guide-to-encryption-key-management-fundamentals.

* cited by examiner

SEPARATE CRYPTOGRAPHIC KEYS FOR MULTIPLE MODES

BACKGROUND

Hardware security modules may be employed to implement security protocols. The hardware security modules may be physical computing devices that safeguard and manage cryptographic keys for authentication and provide cryptographic processing capabilities. Examples of physical computing devices may include a plug-in card or an external device that attaches directly to a network server or another computing device. In these examples, the hardware security modules may offload key management a cryptographic processing operations from the server or other computing device.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
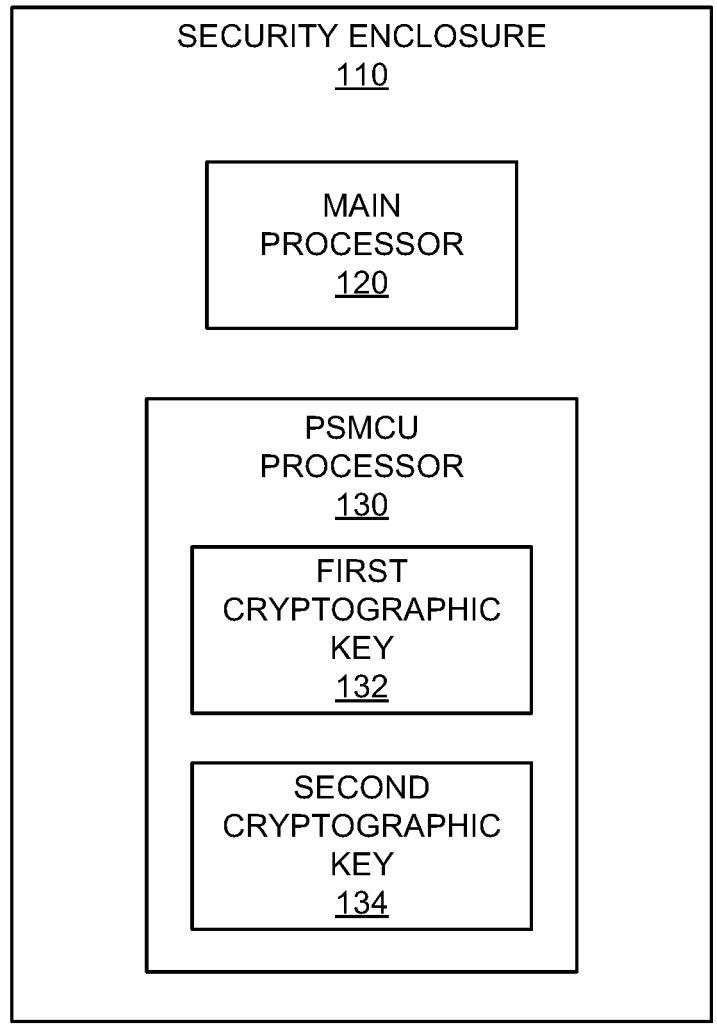
FIG. 1 shows a block diagram of an example apparatus that may provide multiple modes of access to cryptographic keys.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

For a hardware security module (HSM) to receive validation as a PCI-HSM (Payment Card Industry) compliant product, the HSM prevents access to cryptographic keys and keying material, except by code that has been reviewed, evaluated, and approved by an independent external PCI-HSM lab. Part of the items for being PCI-HSM compliant is that the HSM is to receive approval by two separate people for the HSM to enter or exit PCI-HSM operation. In addition, all of the cryptographic keys that are used while in PCI-HSM mode may not be accessible to any code or entity when not in PCI-HSM mode.

Disclosed herein are apparatuses, e.g., HSMs, and methods for implementing the apparatuses that enable the apparatuses to operate fully with PCI-HSM mode enabled or disabled. As discussed herein, the apparatuses disclosed herein may operate fully with PCI-HSM mode enabled or disabled by providing physical security and separation of top-level keys used to encrypt all other subordinate keys. Once the apparatuses disclosed herein enter the PCI-HSM mode, the apparatuses may only make the top-level key for the PCI-HSM mode accessible to the apparatus code and when the PCI-HSM mode is not enabled, the apparatuses may make the top-level key for a non-PCI-HSM mode accessible to the apparatus code without making lower-level keys for the non-PCI-HSM mode available.

As discussed herein, the apparatuses may each include a physical security monitoring control unit (PSMCU) processor housed in a security enclosure. The PSMCU processor may be a security control chip and a root of trust of an apparatus (e.g., a HSM). The PSMCU processor may store clear keys used to protect all of the keys in the apparatus and may store different keys that are accessible by different types of personalities. The PSMCU processor may control operations in the apparatus as either being PCI-HSM compliant or non-PCI-HSM compliant through the granting of access to the different keys. That is, the PSMCU processor may control access to the different keys by different types of personalities so that it may be impossible to access a key used by PCI-HSM mode operations if the apparatus is running another type of personality.

Through implementation of the apparatuses and methods disclosed herein, a single apparatus may operate in either the PCI-HSM mode or a non-PCI-HSM mode. As such, for instance, the apparatuses may initially be used in the non-PCI-HSM mode and may later be switched to a more security-compliant mode or vice versa, without having to purchase a new apparatus.

FIG. 1 shows a block diagram of an example apparatus 100 that may provide multiple modes of access to cryptographic keys. It should be understood that the apparatus 100 may include additional components and that some of the components described herein may be removed and/or modified without departing from a scope of the apparatus 100 disclosed herein.

The apparatus 100 may be a secure apparatus, such as a hardware security module. For instance, the apparatus 100 may be a physical computing device that may safeguard and manage cryptographic keys for authentication and cryptoprocessing. The apparatus 100 may be a plug-in card, an external device, or the like, that may be attached directly to the chassis of a computer, a network server, or the like. As discussed herein, the apparatus 100 may safeguard and manage cryptographic keys for different modes of operation of the apparatus 100. In some examples, the apparatus 100 may be switchably operated at one of a first mode or a second mode. In other examples, the apparatus may be switchably operated in one of a first mode, a second mode, a third mode, etc. As discussed herein, the apparatus 100 may control access by applications to different cryptographic keys based on the mode at which the apparatus 100 is operated.

According to examples, the first mode may be a mode in which operations of the apparatus 100 are compliant with a payment card industry hardware security module (PCI-HSM) regulations and the second mode may be a mode in which operations of the apparatus 100 are not compliant with the PCI-HSM regulations. In this regard, the first mode may be a mode that the apparatus 100 may not enter or exit without approval by two authorized people as well as complying with other requirements. The third mode may also be a mode in which operations of the apparatus are not compliant with PCI-HSM regulations. By way of particular example, the second mode may be a general security mode operation and the third mode may be a mode in which operations of the apparatus 100 are compliant with federal information processing standards.

As shown in FIG. 1, the apparatus 100 may include a security enclosure 110. The security enclosure 110 may be a tamper resistant outer casing of the apparatus 100. That is, the security enclosure 110 may be formed of a relatively rigid material, e.g., metal, hard plastic, or the like, that may protect components housed in the security enclosure 110 from tampering. In addition, the security enclosure 110 may include a serpentine penetration grid and may include contact points for components inside the security enclosure 110 to communicate signals with external components.

The apparatus 100 may include a main processor 120 housed in the security enclosure 110 that may implement various functions in the apparatus 100. The main processor 110 may be a semiconductor-based microprocessor, a central processing unit (CPU), an application specific integrated circuit (ASIC), a field-programmable gate array (FPGA), and/or another hardware device. Although a single main processor 120 is depicted, it should be understood that the apparatus 100 may include multiple main processors, multiple cores, or the like, without departing from a scope of the apparatus 100. In addition or alternatively, the main processor 120 may be in communication with a memory, which may also be housed in the security enclosure 110.

The apparatus 100 may also include a physical security monitoring control unit (PSMCU) processor 130. The PSMCU processor 130 may be a semiconductor-based microprocessor, a central processing unit (CPU), an application specific integrated circuit (ASIC), a field-programmable gate array (FPGA), and/or another hardware device. Although a single PSMCU processor 130 is depicted in FIG. 1, it should be understood that the apparatus 100 may include multiple PSMCU processors 130, multiple cores, or the like, without departing from a scope of the apparatus 100.

As shown, the PSMCU processor 130 may store a first cryptographic key 132 and a second cryptographic key 134. In other examples, the first cryptographic key 132 and the second cryptographic key 134 may be stored outside of the PSMCU processor 130, but within the security enclosure 110. In either of these examples, the PSMCU processor 130 may control access by the main processor 120 to the first cryptographic key 132 and the second cryptographic key 134. In addition, the PSMCU processor 130 may physically maintain the first cryptographic key 132 separately from the second cryptographic key 134 such that access to each of the first cryptographic key 132 and the second cryptographic key 134 may separately be permitted with respect to each other.

The first cryptographic key 132 may correspond to the first mode of apparatus 100 operation and the second cryptographic key 134 may correspond to the second mode of apparatus 100 operation discussed herein. In addition, the first cryptographic key 132 and the second cryptographic key 134 may each be a top-level cryptographic key that may be used to generate lower level cryptographic keys. The secure loader (shown in FIG. 2A), which may also be referenced as a secure loader code, may use the first cryptographic key 132 to validate an integrity of a code image of an application having a first personality (or a first security level) that the secure loader is to load in the apparatus 100. The secure loader may use the second cryptographic key 134 to validate an integrity of a code image of an application having a second personality (or a second security level) that the secure loader is to load in the apparatus 100.

Generally speaking, when the apparatus 100 is operating in the first mode, the PSMCU processor 130 may allow access by the main processor 120 to the first cryptographic key 132 while preventing access by the main processor 120 to the second cryptographic key 134. Likewise, when the apparatus 100 is operating in the second mode, the PSMCU processor 130 may allow access by the main processor 120 to the second cryptographic key 134 while preventing access by the main processor 120 to the first cryptographic key 132. In this regard, the PSMCU processor 130 may selectively provide access to either the first cryptographic key 132 or the second cryptographic key 134.

As the first cryptographic key 132 is associated with a first mode of operation, e.g., a PCI-HSM compliant mode, and the second cryptographic key 134 is associated with a second mode of operation, e.g., an non-PCI-HSM compliant mode, the apparatus 100 may be operated in one of multiple operational modes through control by the PSMCU processor 130 to the cryptographic keys 132, 134. In other words, through control of access to the first cryptographic key 132 and the second cryptographic key 134, the PSMCU processor 130 may control the mode of operation of the apparatus 100 to be either the first mode in which the operations are PCI-HSM compliant or the second mode in which the operations are non-PCI-HSM compliant. Accordingly, the apparatus 100 may operate in either of these modes.

Although not shown in FIG. 1, the apparatus 100 may include a battery backup housed in the security enclosure 110 to enable at least the PSMCU processor 130 to continue to operate in instances in which power delivery to the apparatus 100 is stopped or interrupted. In addition, the apparatus 100 may include a voltage sensor, a temperature sensor, or the like, to which the PSMCU processor 130 may be connected, and the PSMCU processor 130 may determine, for instance, based on the voltage, temperature, or the like, detected by the voltage sensor, temperature sensor, or the like, whether conditions in or around the security enclosure 110 are outside of normal levels. The PSMCU processor 130 may also determine whether physical penetration of the security enclosure 110 has occurred based upon a physical security barrier in the security enclosure 110 being disrupted or broken. Based on a determination that conditions in or around the security enclosure 110 are outside of normal levels and/or that the physical security barrier has been disrupted or broken, the PSMCU processor 130 may determine that a tamper has occurred. In addition, based on a determination that a tamper has occurred, the PSMCU processor 130 may erase the cryptographic keys 132, 134 to thus prevent access to those keys.

Figure 2A:
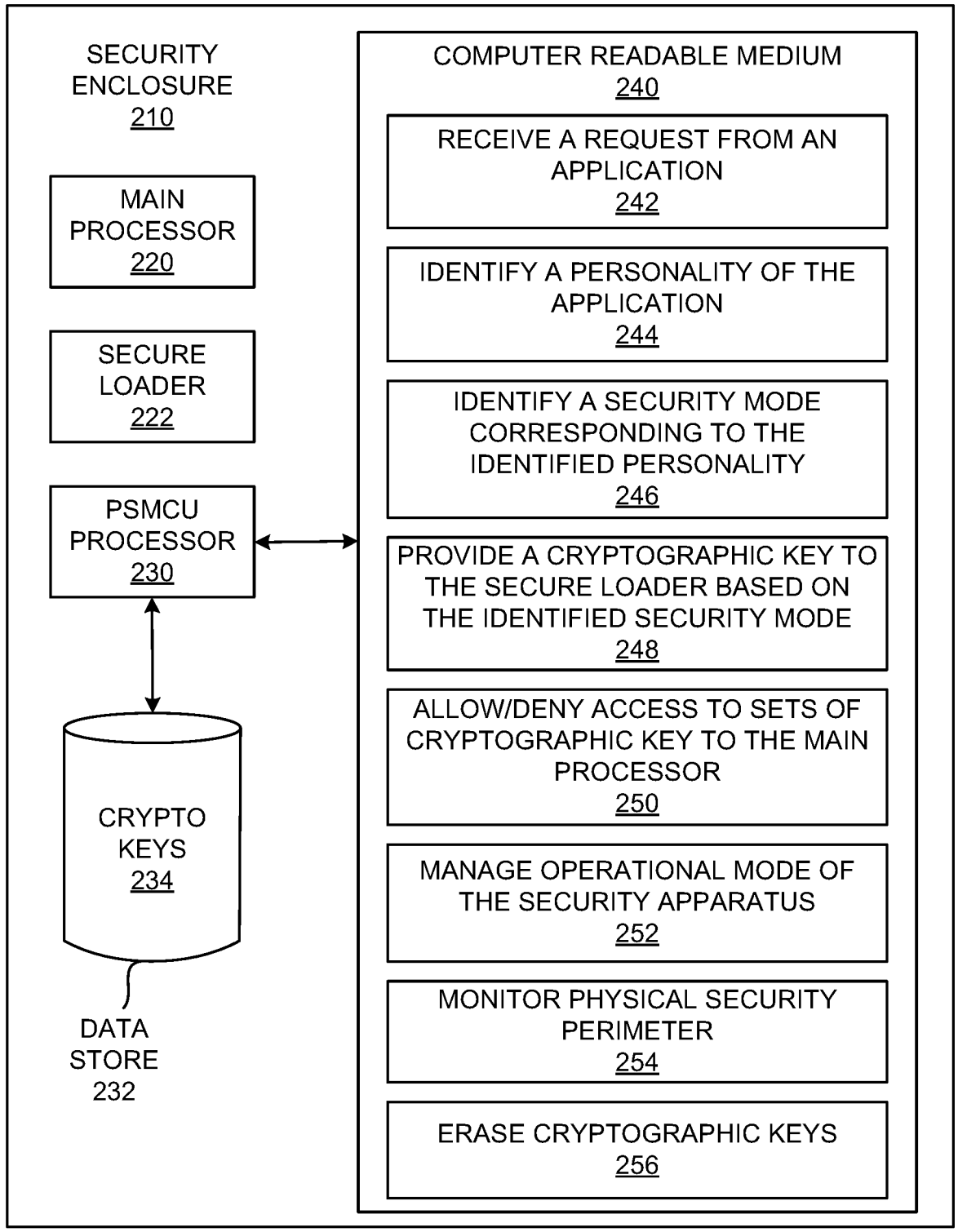
FIG. 2A shows a block diagram of an example security apparatus that may provide multiple modes of access to cryptographic keys.

Turning now to FIG. 2A, there is shown a block diagram of an example security apparatus 200 that may provide multiple modes of access to cryptographic keys. It should be understood that the security apparatus 200 may include additional components and that some of the components described herein may be removed and/or modified without departing from a scope of the security apparatus 200 disclosed herein. The security apparatus 200 may be similar to the apparatus 100 depicted in FIG. 1 and may thus be a hardware security module, such as a physical computing device that may safeguard and manage cryptographic keys for authentication and cryptoprocessing. The security apparatus 200 may be a plug-in card, an external device, or the like, that may be attached directly to a computer, a network server, or the like.

As shown, the security apparatus 200 may include a security enclosure 210, which may be similar to the security enclosure 110 discussed above with respect to the apparatus 100. The security apparatus 200 may also include a main processor 220 housed within the security enclosure 210, which may be similar to the main processor 120 discussed above with respect to the apparatus 100. The security apparatus 200 may further include a secure loader 222, which may also be referenced herein as a secure loader code. The secure loader 222 may be machine readable instructions stored on a storage device (not shown) within the security enclosure 210 that the main processor 220 may execute, for instance, during an initial code image loading operation for an application.

The security apparatus 200 may further include a PSMCU processor 230 housed within the security enclosure 210. The PSMCU processor 230 may be similar to the PSMCU processor 130 discussed above with respect to the apparatus 100. As shown, the PSMCU processor 230 may be connected to a data store 232 and a computer readable medium 240, which may be a non-transitory computer readable medium 240. The data store 232 and the computer readable medium 240 may each include an electronic, magnetic, optical, or other physical storage device that stores data and/or executable instructions. For example, the data store 232 and/or the computer readable medium 240 may be a Random Access memory (RAM), an Electrically Erasable Programmable Read-Only Memory (EEPROM), a hard disk, an optical disc, or other type of storage device. In some examples, the data store 232 and the computer readable medium 240 may be a single component housed in the security enclosure 210.

Generally speaking, the PSMCU processor 230 may be a security control chip and a root of trust of the security apparatus 200. The PSMCU processor 230 may be connected to a backup battery such that the PSMCU processor 230 may remain powered when the security apparatus 200 is in a secure state. The PSMCU processor 230 may store clear keys used to protect all of the keys in the security apparatus 200. There are different keys that are accessible by different types of personalities so that it may be impossible to access a key used by PCI-HSM mode operations if the security apparatus 200 is running another type of personality. Thus, although the cryptographic keys 234 are depicted as being stored in the data store 234, the cryptographic keys 234 may instead be stored in the PSMCU processor 230.

The keys that may be stored in the PSMCU processor 230 are shown in Table 1 below. All of keys in the PSMCU processor 230 may be AES256 keys. In addition to the 4 top-level keys, a security apparatus authorization key (SAAK) may also be stored in the PSMCU processor 230. The SAAK is the key that is used to encrypt all user-loaded keys for a given personality. Thus, when the SAAK is erased, the security apparatus 200 may be forced back to factory state, in which the security apparatus 200 may contain critical security parameters initially generated or loaded by the security apparatus 200 manufacturer. The SAAK may be erased if the security apparatus 200 is removed from a server chassis or other chassis.

The SAAK is stored encrypted under the top level key for the given personality type (i.e., PCI Internal Master File Key (PIMFK), Normal Internal Master File Key (NIMFK), or a Federal Information Processing Internal Master File Key (FIMFK)). A new value may be generated whenever the type of code being run is changed.

TABLE 1

Keys stored by the PSMCU processor 230.

| Key | Stored | Accessible by | Erased | Protects |
|---|---|---|---|---|
| IMFK | Clear | Secure Loader only | On tamper | Loader keys, particularly code signing public keys |
| PIMFK | Clear | PCI-HSM personality only | On tamper | Personality specific infrastructure keys (e.g. root identity keys), SAAK |
| NIMFK | Clear | General (non-validated) personality only | On tamper | Personality specific infrastructure keys (e.g. root identity keys), SAAK |
| FIMFK | Clear | FIPS validated personality only | On tamper | Personality specific infrastructure keys (e.g. root identity keys), SAAK |
| SAAK | Encrypted by xIMFK | Any personality | On tamper, card removal, or reset to factory state | All keys generated/ loaded by personality (MFK, AMK, . . . ) |

In addition to monitoring the security perimeter and protecting/erasing the top level keys, the PSMCU processor 230 may maintain security state variables that control how the security apparatus 200 operates. These variables are shown in Table 2.

TABLE 2

PSMCU Processor 230 State Variables

| State Variable | Description | Set by | Values |
|---|---|---|---|
| ACCESS | Determines which key(s) the currently running software may access. | PSMCU processor 230. The PSMCU processor 230 will reset this value to "Loader" when the PSMCU processor 230 detects a host power cycle or a reset of the PCI bus where the card is connected. The PSMCU processor 230 then transitions to the appropriate value when the loader notifies that PSMCU processor 230 that the personality is being started. Note that the allowed transition depends on the stored value of the TYPE variable. | Loader PCI NSP FIPS |

TABLE 2-continued

PSMCU Processor 230 State Variables

| State Variable | Description | Set by | Values |
| --- | --- | --- | --- |
| TYPE | Determines the type of code that the secure loader 222 is willing to run. | PSMCU processor 230. The PSMCU processor 230 will set this value when the secure loader 222 notifies the PSMCU processor 230 that the personality is being started. Note that TYPE = General can be indirectly changed to any of the other 3 types, when the ACCESS is set. However, once one of the other types is set, only personalities running that type will be allowed to run. The only way to change the TYPE is for the TRF flag to be enabled when the host server is power-cycled or the PCI bus is reset. | General PCI NSP FIPS |
| TRF | Type Reset Flag, a flag that indicates the Type will be reset (TRF = 1) on a host power-cycle or PCI bus reset. The TRF also indicates that one of the three personality modes is active (TRF = 0), since the type cannot be changed. | Personality. This value is initially set to 1 when entering SECURE state by the PSMCU processor 230. After that, the personality will clear this bit when the security apparatus 200 is dual-control enrolled in an association, which activates one of the three modes (PCI, FIPS, NSP). The TRF may also be set by the personality when the association is reset to the factory state. The PCI-HSM personality will only set the bit when the factory reset is done as a dual-control operation. | 0, 1 |

As shown, the data store 232 may have stored thereon cryptographic keys 234. The cryptographic keys 234 may include the first cryptographic key 132, the second cryptographic key 134, a third cryptographic key, and so forth. In other examples, and as discussed above, the cryptographic keys 234 may instead be stored directly on or in the PSMCU processor 230. The non-transitory computer readable medium 240 may have stored thereon machine-readable instructions 242-256 that the PSMCU processor 230 may execute.

The PSMCU processor 230 may fetch, decode, and execute the machine-readable instructions 242 to receive a request from an application associated with a personality (e.g., a security level) to access a cryptographic key stored in the security apparatus 200. The personality may be equivalent to a particular mode of operation of the security apparatus 200. In this regard, for instance, the personality to which an application is associated may indicate whether the security apparatus 200 is to operate under a PCI-HSM compliant mode or a non-PCI-HSM compliant mode. In this regard, the personality associated with an application may be responsible for user enrollment and enforcing dual control operations as well as general cryptographic services.

The PSMCU processor 230 may fetch, decode, and execute the machine-readable instructions 244 to identify the personality, e.g., security level, to which the application is associated. That is, the application requesting access to the cryptographic key may include an indication of the personality and the PSMCU processor 230 may identify the personality from the indication accompanying the application.

The PSMCU processor 230 may fetch, decode, and execute the machine-readable instructions 246 to identify or select a security mode corresponding to the identified personality associated with the application. The security mode may be one of a PCI-HSM compliant mode or a non-PCI-HSM compliant mode. The security mode may also be a federal information processing standard compliant mode.

The PSMCU processor 230 may fetch, decode, and execute the machine-readable instructions 248 to provide a cryptographic key to the secure loader 222 based on the identified security mode. That is, the main processor 220 may reset and start the secure loader 222 and following an initial start of the security apparatus 200 to enable access to the security apparatus 200 by the application, the PSMCU processor 230 may provide one of the first cryptographic key 132, the second cryptographic key 134, the third cryptographic key, or the like to the secure loader 222. The selected cryptographic key provided to the secure loader 222 may be a top-level cryptographic key corresponding to a mode of operation of the security application 200 to which the application is requesting access. In instances in which the application is requesting access to PCI-HSM compliant operations, the PSMCU processor 230 may provide a cryptographic key corresponding to PCI-HSM compliant operations.

According to examples, the secure loader 222 may use the received cryptographic key to encrypt internally used key tables of the secure loader 222. In addition, the secure loader 222 may use the key tables to validate an integrity of a code image of the application. For instance, the secure loader 222 may verify whether the code image of the application is cryptographically signed by a trusted entity. The secure loader 222 may also verify whether the code image is the correct type of code, e.g., PCI-HSM validated code, non-validated code, etc. The secure loader 222 may not have access to user keys or any keys used by a personality during operation. In addition, when the secure loader 222 launches the personality code, the secure loader 222 may notify the PSMCU processor 230 of the type of code that is being run, which may enable the PSMCU processor 230 to enforce the correct access control around the cryptographic keys.

The PSMCU processor 230 may fetch, decode, and execute the machine-readable instructions 250 to allow or deny access to sets of cryptographic keys. That is, for instance, the secure loader 222 may inform the PSMCU processor 230 as to whether the code image of the application has been validated. Based on a determination that the code image has been validated, the PSMCU processor 230 may allow the main processor 220 access to a set of cryptographic keys corresponding to the selected mode of operation of the security apparatus 200. However, in response to a determination that the code image has not been validated, the PSMCU processor 230 may deny the main processor 220 access to a set of cryptographic keys corresponding to the selected mode of operation of the security apparatus 200. In any regard, the main processor 220 may use the sets of cryptographic keys to provide the application to operate securely.

The PSMCU processor 230 may fetch, decode, and execute the machine-readable instructions 252 to manage an operational mode of the security apparatus 200. Particularly, for instance, the PSMCU processor 230 may determine whether the security apparatus 200 has undergone a power cycle, e.g., the security apparatus 200 was turned off and turned back on, the security apparatus 200 experienced a power fluctuation, or the like, and may manage the security apparatus 200 to remain in the selected mode following the power cycle. That is, for instance, if the security apparatus 200 was operating under the PCI-HSM compliant mode prior to the power cycle, the PSMCU processor 230 may cause the security apparatus 200 to continue to operate under the PCI-HSM compliant mode following the power cycle. Likewise, if the security apparatus 200 was operating under a non-PCI-HSM compliant mode prior to the power cycle, the PSMCU processor 230 may cause the security apparatus 200 to continue to operate under the non-PCI-HSM compliant mode following the power cycle. In this regard, the PSMCU processor 230 may not exit the particular security mode when the security apparatus 200 experiences a power cycle. Instead, to be compliant with PCI-HSM requirements, the PSMCU processor 230 may exit the PCI-HSM compliant mode following receipt of dual authorization, e.g., from two or more operators.

The PSMCU processor 230 may fetch, decode, and execute the machine-readable instructions 254 to monitor a physical security perimeter of the security enclosure 210. The security apparatus 200 may include a voltage sensor, a temperature sensor, or the like, to which the PSMCU processor 230 may be connected, and the PSMCU processor 230 may monitor various conditions sensed by the sensors. For instance, the PSMCU processor 230 may monitor the voltage of the security apparatus 200, the temperature of the security apparatus 200, or the like. The security apparatus 200 may also include a physical security barrier, such that, the PSMCU 230 may determine when the physical security barrier has been disrupted or broken. In addition, the PSMCU processor 230 may determine whether any of these conditions is outside of normal levels and/or whether the penetration grid or other physical security barrier has been disrupted or broken, which may be an indication of an intrusion attempt. Based on a determination that conditions in or around the security enclosure 210 are outside of normal levels and/or that the physical security barrier has been disrupted or broken, the PSMCU processor 230 may determine that a tamper has occurred on the security apparatus 200. For instance, the PSMCU processor 230 may determine that an attempt to access the cryptographic keys 234 has been made.

The PSMCU processor 230 may fetch, decode, and execute the machine-readable instructions 256 to erase the cryptographic keys 234 based on a determination that a tamper has occurred. The PSMCU processor 230 may also erase user keys that may have been generated from the cryptographic keys 234 based on a determination that a tamper has occurred. In this regard, the PSMCU 230 may prevent unauthorized access to the cryptographic keys 234.

Figure 2B:
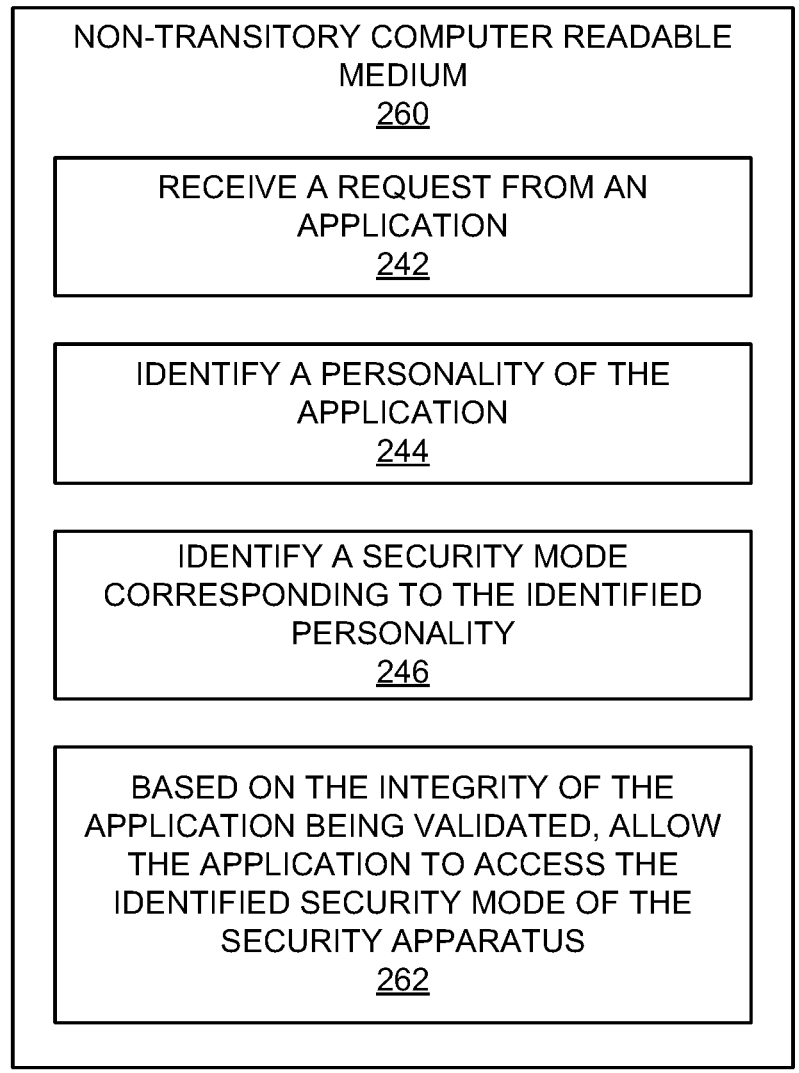
FIG. 2B shows a block diagram of an example non-transitory computer readable medium that may allow an application to access an identified security mode based on an integrity of the application being validated.

Turning now to FIG. 2B, there is shown a block diagram of an example non-transitory computer readable medium 260 that may allow an application to access an identified security mode based on an integrity of the application being validated. As shown, the non-transitory computer readable medium 260 may include the instructions 242-246 discussed above with respect to the computer readable medium 240 depicted in FIG. 2A and thus, the instructions 242-246 are not discussed in further detail herein with respect to FIG. 2B. However, the non-transitory computer readable medium 260 depicted in FIG. 2B may also include instructions 262, which the PSMCU processor 230 may execute to, based on the integrity of the application being validated, allow the application to access the identified security mode of a security apparatus 200.

Figure 3:
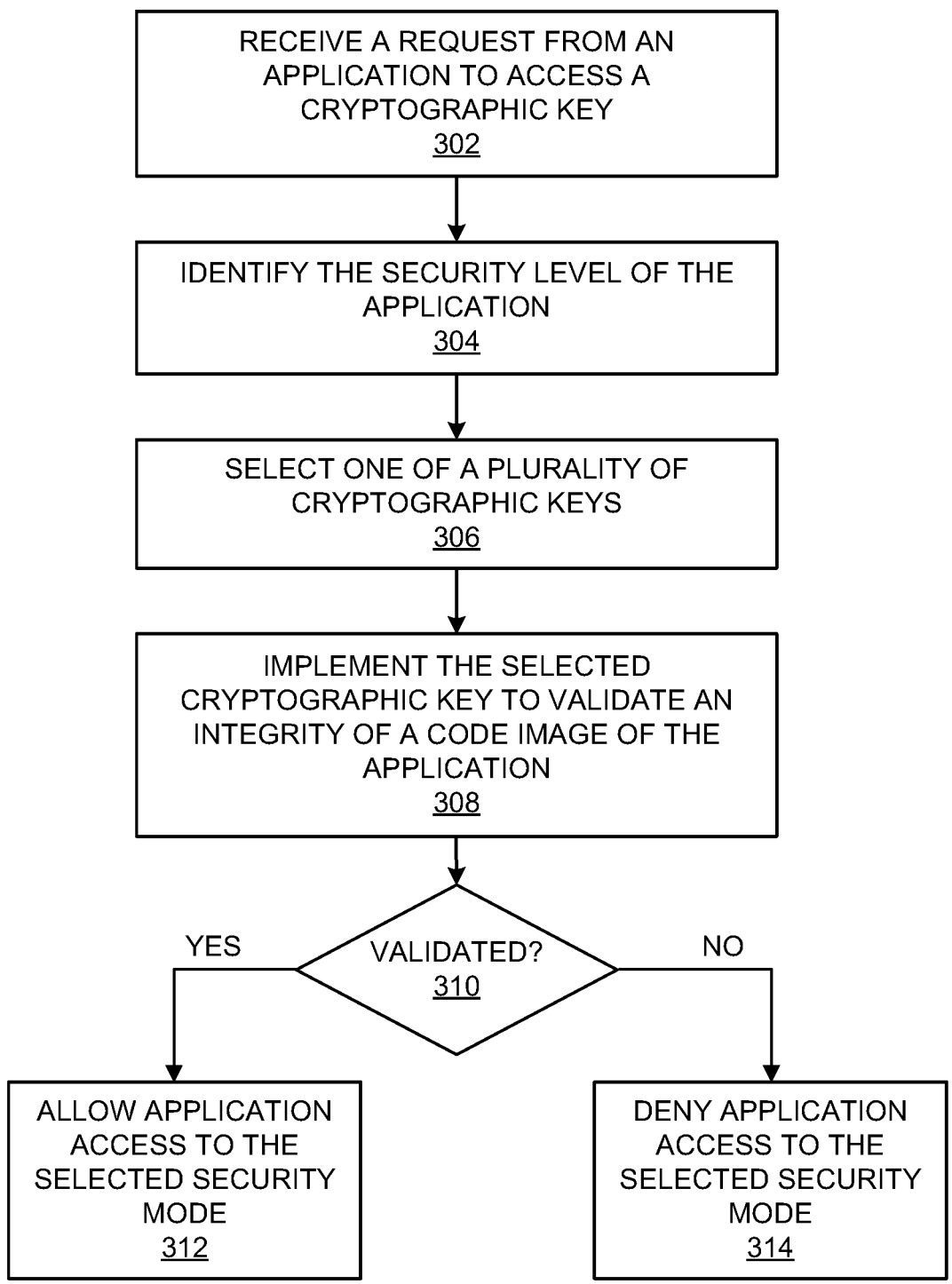
FIGS. 3, 4, 5, and 6 respectively, show flow diagrams of example methods for managing a security apparatus to provide multiple modes of access to cryptographic keys.

Reference is now made to FIG. 3, which depicts a flow diagram of an example method 300 for managing a security apparatus 200 to provide multiple modes of access to cryptographic keys. It should be understood that the method 300 depicted in FIG. 3 may include additional operations and that some of the operations described therein may be removed and/or modified without departing from the scope of the method 300. The description of the method 300 is also made with reference to the features of the security apparatus 200 depicted in the FIG. 2A for purposes of illustration.

At block 302, the security apparatus 200 may receive a request from an application to access a security mode of a plurality of security modes of the security apparatus 200. The security modes may include a first security mode in which operations of the security apparatus 200 are PCI-HSM compliant and a second security mode in which operations of the security apparatus 200 are non-PCI-HSM compliant. In some examples, the security modes may also include a third security mode in which operations of the security apparatus 200 are non-PCI-HSM compliant, but comply with federal information processing standards (FIPS).

At block 304, the security apparatus 200 may identify the security level, e.g., personality, to which the application is associated. The security apparatus 200 may, for instance, determine whether the application is associated with a PCI transaction, a non-PCI transaction, a FIPS transaction, or the like.

At block 306, the security apparatus 200 may select one of a plurality of cryptographic keys based on the identified security level to which the application is associated. As discussed herein, each of the cryptographic keys may correspond to a respective security mode. For instance, a first cryptographic key 132 may correspond to a first security mode, e.g., a PCI-HSM compliant mode, a second cryptographic key 134 may correspond to a second security mode, e.g., a general non-PCI-HSM compliant security mode, and a third cryptographic key may correspond to a third security mode, e.g., a FIPS compliant mode, At block 308, the security apparatus 200 may implement the selected cryptographic key to validate an integrity of a code image of the application that the security apparatus 200 is to load. For instance, the PSMCU processor 230 may provide the selected cryptographic key to the secure loader 222, and the secure loader 222 may use the cryptographic key to validate the code image of the application.

At block 310, the security apparatus 200 may determine whether the code image of the application has been validated. For instance, the secure loader 222 may determine that the code image of the application has been validated based on a determination that the code image of the application is cryptographically signed by a trusted entity. The secure loader 222 may also determine that the code image has been validated based on a determination that the code image is the correct type of code, e.g., PCI-HSM validated code, non-validated code, etc. The secure loader 222 may also inform the PSMCU processor 230 as to whether or not the code image has been validated.

Based on a determination that the code image has been validated, the PSMCU processor 230 may allow the application access to the selected security mode as indicated at block 312. That is, for instance, the PSMCU processor 230 may enable the application to generate keys under the selected security mode. Based on a determination that the code image has not been validated, the PSMCU processor 230 may deny the application from accessing the selected security mode as indicated at block 314. That is, for instance, the PSMCU processor 230 may prevent the application from generating keys under the selected security mode.

Figure 4:
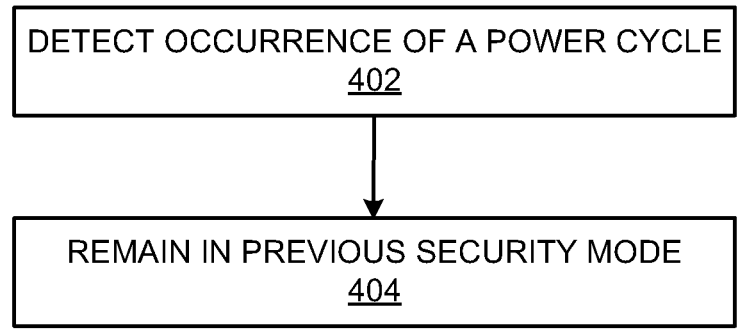
Figure 5:
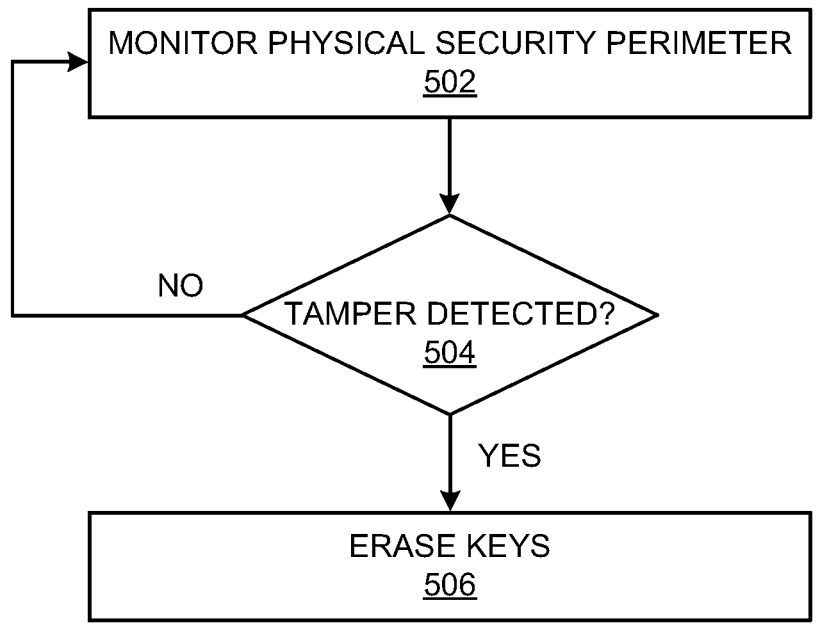

With reference now to FIGS. 4 and 5, there are respectively shown flow diagrams of other example methods 400, 500 for managing the security apparatus 200. It should be understood that the methods 400 and 500 respectively depicted in FIGS. 4 and 5 may include additional operations and that some of the operations described therein may be removed and/or modified without departing from the scopes of the methods 400 and 500. The descriptions of the methods 400 and 500 are also made with reference to the features of the security apparatus 200 depicted in the FIG. 2A for purposes of illustration.

Generally speaking, the PSMCU processor 230 may implement the method 400 following block 312 in the method 300 depicted in FIG. 3. In addition, the PSMCU processor 230 may implement the method 500 following either block 312 or block 314 in the method 300 depicted in FIG. 3.

With reference first to FIG. 4, at block 402, the PSMCU processor 230 may detect that the security apparatus 200 has undergone a power cycle following the PSMCU processor 230 allowing the application access to the selected security mode at block 312 (FIG. 3). In addition, at block 404, the PSMCU processor 230 may, following power being reestablished to the security apparatus 200, cause the security apparatus 200 to remain in the selected security mode. That is, instead of exiting the selected security mode, e.g., the PCI-HSM compliant mode, when the power cycle occurred, the PSMCU processor 230 may cause the security apparatus 200 to remain in the selected security mode, e.g., the PCI-HSM compliant mode. As the PCI-HSM regulations may indicate that dual authorization may be required to exit out of the PCI-HSM mode, remaining in the selected security mode following the power cycle may enable the security apparatus 200 to be compliant with PCI-HSM regulations.

With reference now to FIG. 5, at block 502, the PSMCU processor 230 may monitor the physical security perimeter of the security apparatus 200. For instance, the PSMCU processor 230 may monitor the temperature, the voltage, mechanical stresses, breaks in a physical security barrier, etc., to determine whether conditions in or around the security apparatus 200 are within normal levels. As the PSMCU processor 230 monitors the physical security perimeter of the security apparatus 200, the PSMCU processor 230 may determine whether a tamper is detected at block 504. Based on a determination that a tamper has not been detected at block 504, the PSMCU processor 230 may continue to monitor the physical security perimeter of the security apparatus 200 at block 502. However, based on a determination that a tamper has been detected at block 504, the PSMCU processor 230 may erase keys stored in the security apparatus 200. For instance, the PSMCU processor 230 may erase all of the cryptographic keys, user keys, etc., to prevent these keys from unauthorized access.

Figure 6:
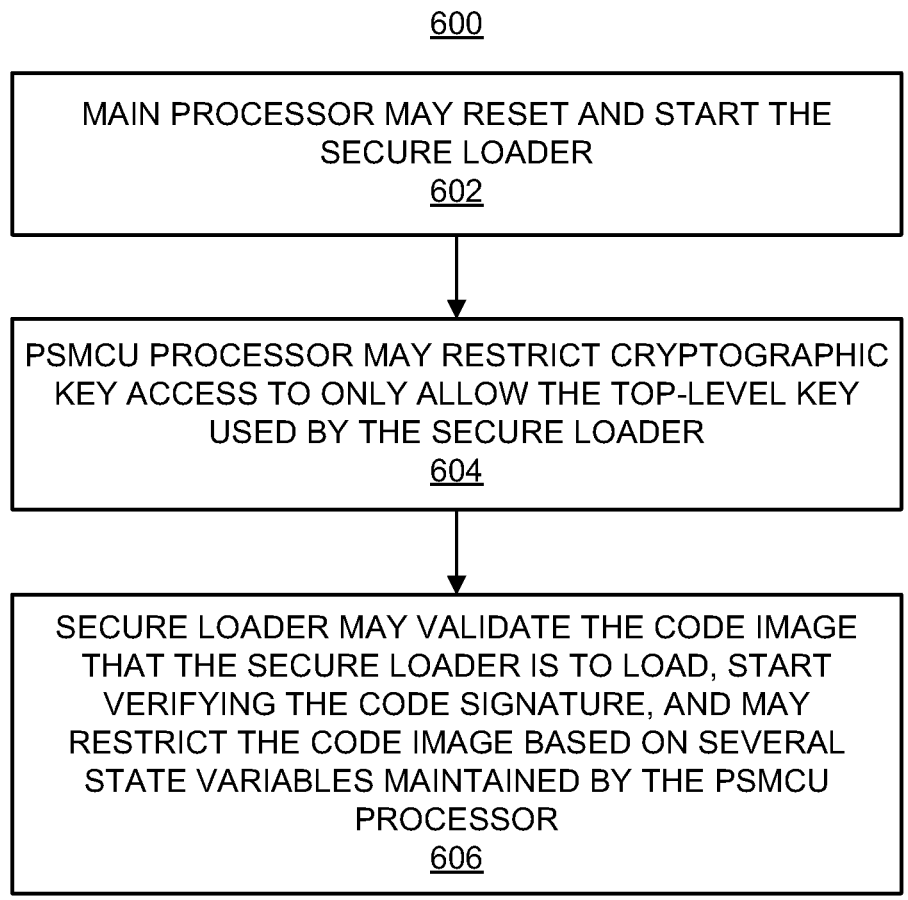

Turning now to FIG. 6, there is shown a flow diagram of another example method 600 for managing a security apparatus 200. The method 600 may be similar to the method 300, but may include details in addition to those discussed above with respect to the method 300.

At block 602, when the security apparatus 200 first starts, the main processor 220 may reset and start the secure loader 222. At block 604, the PSMCU processor 230 may restrict cryptographic key access to only allow the top-level key used by the secure loader 222 to encrypt an internally used key table of the secure loader 222. At block 606, the secure loader 222 may validate the code image that the secure loader 222 is to load, may start verifying the code signature, and may restrict the code image based on several state variables maintained by the PSMCU processor 230.

The first variable "STATE" may be used to indicate whether the PSMCU processor 230 is in an active security monitoring operation (STATE=secure); in a state prior to the active monitoring that may be used to verify that the security apparatus 200 is functioning properly (STATE=test); or in a state where a tampering attempt has been detected and all cryptographic keys have been erased (STATE=tamper). In addition, once the PSMCU processor 230 has entered a "secure" STATE, there may not be a way to get out of the "secure" STATE without tampering with the security apparatus 200.

A second variable "ACCESS" may be used to indicate the cryptographic key access that is allowed by the application currently running on the main processor 220. The initial code that is executed on the main processor 220 after a power on or reset event is the secure loader 222 (or equivalently, the secure loader code 222) (ACCESS=loader). In addition, the only way for the variable ACCESS to get set to "loader" may be by the PSMCU processor 230 detecting a host power-cycle or PCIe bus reset (host reboot).

The last two variables "TYPE" and "TRF" (Type Reset Flag) may be used together to provide the mechanism that determines which type of code is allowed to be run and restricts it to only that type once the security apparatus 200 is enrolled. When the secure loader 222 is running and no operating mode has been authorized (TYPE=general), the secure loader 222 may allow any of the three types of code to be started.

The secure loader 222 may first notify the PSMCU processor 230 by setting the ACCESS to that type. The PSMCU processor 230 may allow any ACCESS value (other than "loader") when the TYPE is "general", but may will only allow ACCESS to be set the same as TYPE, otherwise. Since the PSMCU processor 230 controls access to the cryptographic keys 234, even if the secure loader 222 started code that was different than the TYPE variable, the PSMCU processor 230 may not give any access to the cryptographic keys that are for a different TYPE.

Once operating in the mode-specific code (ACCESS=first type (e.g., PCI-HSM compliant mode), second type (e.g., general type), or third type (e.g., FIPS compliant mode), there may be no direct way to change the ACCESS or TYPE other than the automatic change the PSMCU processor 230 may perform when the PSMCU processor 230 detects a host power cycle or bus reset. When this occurs, the PSMCU processor 230 may automatically change the ACCESS back to "loader" and if the TRF variable is "enabled", the PSMCU processor 230 may reset the TYPE back to "general". If the TRF variable was "disabled", the PSMCU processor 230 may not change the TYPE, which will restrict only that TYPE from being loaded next. This method allows the secure loader 222 to start type-specific code and until it is enrolled, will keep resetting the type and allowing any type code to be started. Once dual authorization is done to enroll the security apparatus 200 into that TYPE, the value will stay the same, which may only allow that same TYPE code to be executed.

According to examples, the security apparatus 200 may be defined as operating in PCI-HSM mode when the security apparatus 200 is running PCI-HSM validated code and a PCI-HSM security association is defined. Prior to the definition of the security association, only status commands and commands that are create or load a security association may function. To enter the PCI-HSM mode, a security administrator may follow the following process:

Store the PCI-HSM validated personality into the HSM;
Set the config.prm to boot using the desired PCI-HSM personality;
Boot/restart the HSM; and
Generate or load a PCI-HSM Association key and association security policy (Dual control operation). This will generate a security apparatus authorization key (SAAK) that will be used to derive encryption and CMAC keys used to store the association, it's keys, and configuration in flash.

Once the security apparatus 200 is in the PCI-HSM mode, the TRF flag that is enabled initially, may be cleared by the personality of the application, which may cause the PSMCU processor 230 to leave the TYPE alone even if the security apparatus 200 is power-cycled or the code is upgraded, thus forcing the TYPE to stay set to the PCI-HSM mode and only allowing a PCI-HSM mode personality to be loaded.

The security apparatus 200 may exit the PCI-HSM mode by resetting the security apparatus 200 to a factory state via a dual control operation. According to examples, the security apparatus 200 may support two types of factory reset operations:

1. Dual control reset to factory state: This procedure may be performed by two security administrators via a secure configuration assistant. Under this procedure, the security apparatus 200 may erase all user keys and may exit the PCI-HSM mode, which may set the TRF flag again and may allow the TYPE to be changed when the security apparatus 200 is power cycled.
2. Single control reset to factory state: This procedure may be performed by a single user via direct connection to the serial port on the security apparatus 200. Under this procedure, all user keys may be erased, but the security apparatus 200 may remain in the PCI-HSM mode (i.e., the TRF flag may remain disabled, causing the PSMCU processor 230 to leave the TYPW unchanged on a power cycle). In addition, the security apparatus 200 may continue to run only PCI-HSM validated code and may allow the generation/loading of only PCI-HSM associations.

The security apparatus 200 may also exit the PCI-HSM mode through removal of the security apparatus from a hardware security module chassis, which may erase the security apparatus authorization key, effectively resetting the security apparatus 200 to factory state. The security apparatus 200 may treat the removal of the security apparatus 200 from the hardware security module chassis like a single-control factory reset. As such, the security apparatus 200 may erase keys, but the security apparatus 200 may remain in the PCI-HSM state and the TRF flag may stay disabled.

In instances in which the security apparatus 200 is not in the PCI-HSM mode (e.g., a general mode or a FIPS compliant mode), the security apparatus 200 may exit from the non-PCI-HSM mode without dual control exit and will set the TRF flag when a single-user factory reset is done.

Some or all of the operations set forth in the methods 300-600 may be contained as utilities, programs, or subprograms, in any desired computer accessible medium. In addition, the methods 300-600 may be embodied by computer programs, which may exist in a variety of forms. For example, the methods 300-600 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 7:
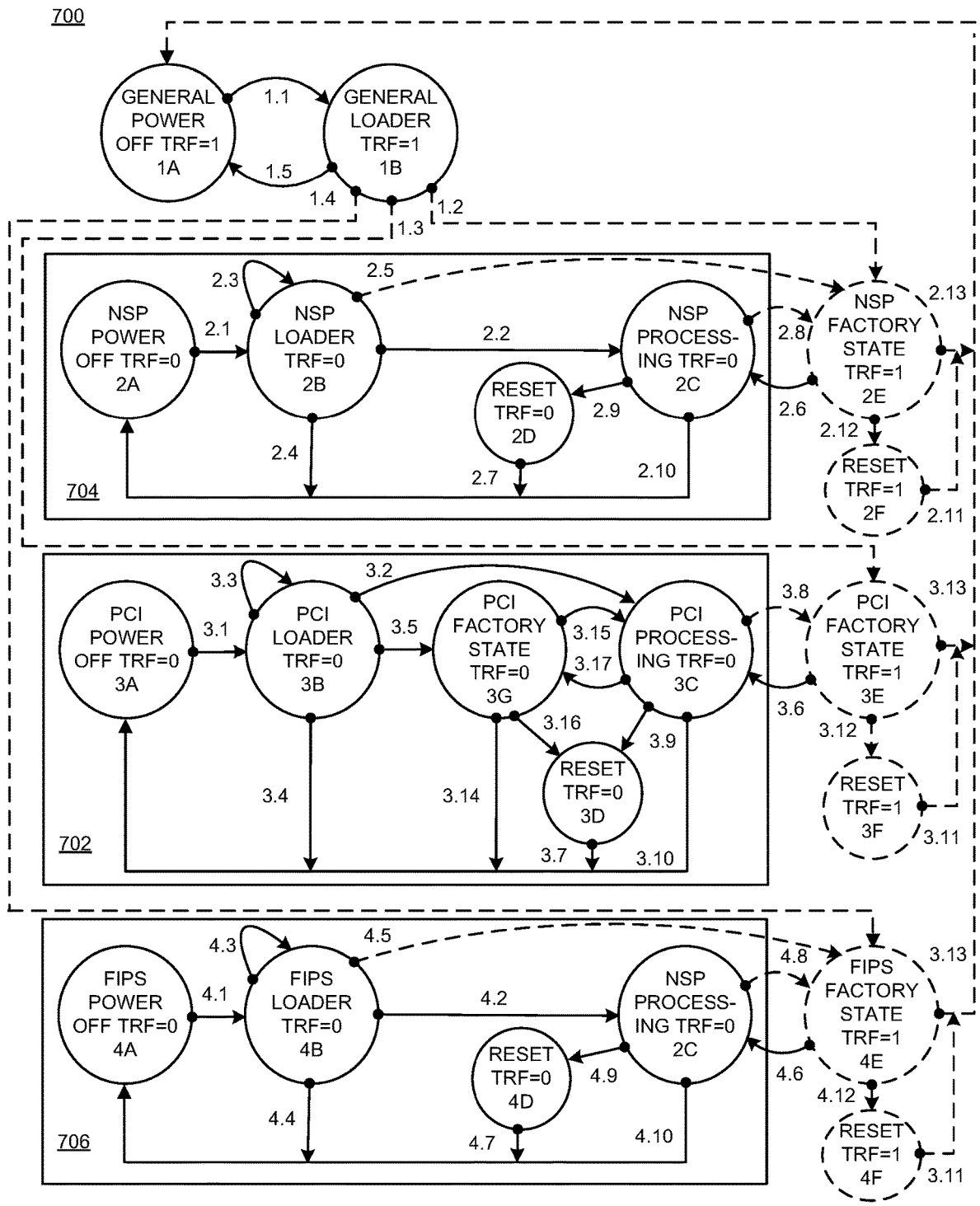
FIG. 7 shows an example state diagram for the security apparatus shown in FIG. 2A.

Turning now to FIG. 7, there is shown an example state diagram 700 for the security apparatus 200, which depicts a process of booting and entering various security apparatus 200 modes. It should be understood that the state diagram 700 may include additional components and that some of the components described herein may be removed and/or modified without departing from a scope of the state diagram 700 disclosed herein.

Initially, it should be noted that the state diagram 700 do not show details on the loading of personalities and config-.prm and instead, the state diagram 700 is focused on control points that prevent the security apparatus 200 from moving into or out of the PCI-HSM mode without dual control. It should be noted that the states in the box 702 and 1A and 1B correspond to when PCI-HSM validated code is running (states 1A and 1B plus states 3A through 3G). States 1A and 1B indicate when the secure loader 222 is running and the States 3A through 3G show when the personality is running, with the dashed circles (States 3E and 3F) showing when the security apparatus 200 is running the personality but not operating in the PCI-HSM mode. The box 702 shows when the security apparatus 200 is operating in the PCI-HSM mode (e.g., States 3A to 3D and 3G). As may be seen in comparing boxes 702 with boxes 704 and 706, state 3G in the PCI-HSM mode differs from the NSP mode 704 and the FIPS mode 706.

The state diagram 700 does not provide a distinction between a card reset that is caused by the PCI bus to which the security apparatus 200 is plugged into being reset or turning the security apparatus 200 power off and on again at some later time. The security apparatus 200 behavior in these two events may be identical and may cause the secure loader 222 to be started. The host PCI bus reset may be caused by rebooting the host server and may just be treated as a power off event followed immediately by a power on event within the security apparatus 200.

Table 3 below defines the NSP (general) mode 704 and the PCI states for the PCI mode 702, and Table 4 defines the transitions between these states. It should be noted that NSP and FIPS states may be irrelevant to PCI-HSM validation and are thus not described in detail herein. It should also be noted that descriptions provided for the elements in the state diagram 700 may also be applicable to elements having similar numerals. For instance, the description for element 3.1 may be similar to descriptions for elements 2.1 and 2.2, but these descriptions may be directed to NSP and FIPS modes 704, 706 instead of the PCI-HSM mode 702. In state 1A, the PSMCU processor 230 may always set the ACCESS variable to "Loader" during boot/reboot of the security apparatus 200 and thus, the value of the variable ACCESS may be irrelevant in power off states.

TABLE 3

State Descriptions

| State | Description | PSMCU State Variables |
|---|---|---|
| 1A: Host Power Off | Host power disconnected from security apparatus 200. | ACCESS = N/A TYPE = General TRF = 1 |
| 1B: General Loader | Loader is authorized to load any type of authorized entity signed code. Only the IMFK key is accessible. | ACCESS = Loader TYPE = General TRF = 1 |
| 3A: Host Power Off - PCI | Host power disconnected from the security apparatus 200. Nonvolatile memory is set so that the security apparatus 200 will only run PCI-HSM validated code on power up. | ACCESS = N/A TYPE = PCI TRF = 0 |
| 3B: PCI Loader | Similar to General Loader, except the HSM is in PCI-HSM mode, so the only code that can be loaded is PCI-HSM validated code. Only the IMFK key is accessible from the PSMCU processor 230. | ACCESS = Loader TYPE = PCI TRF = 0 |
| 3C: PCI Processing | PCI-HSM mode personality state. This is the only PCI state which allows transaction processing. Only the PCI Internal Master File Key (PIMFK), SAAK, and TRF are accessible from the PSMCU processor 230. | ACCESS = PCI TYPE = PCI TRF = 0 |
| 3D: PCI Reset | Temporary non-operational state which causes automatic security apparatus 200 reboot. No keys can be accessed. | ACCESS = PCI TYPE = PCI TRF = 0 |
| 3E: Pre-PCI Factory State | PCI-HSM validated code is running, but no user keys are loaded and the product is not yet in PCI-HSM mode operation. No cryptographic services are available. Only the PCI Internal Master File Key (PIMFK), SAAK and TRF are accessible from the PSMCU processor 230. | ACCESS = PCI TYPE = PCI TRF = 1 |
| 3F: Pre-PCI Reset | Temporary non-operational state which causes automatic security apparatus 200 reboot. No keys can be accessed. The difference between 3D and 3F is that 3D is in PCI-HSM mode and 3F is not. The TRF equals one in state 3F, allowing the reboot process to start non-PCI validated code. | ACCESS = PCI TYPE = PCI TRF = 1 |
| 3G: PCI Factory State | PCI-HSM mode personality state with no user keys loaded. PCI-HSM validated code is running. The primary difference between states 3E and 3G is that 3G is operating in PCI-HSM mode, and 3F is not. Operating in PCI-HSM mode means only PCI-HSM associations may be generated or loaded and only PCI-HSM validated code may be loaded if the security apparatus 200 is restarted from this state. Only the PCI Internal Master File Key (PIMFK), SAAK and TRF are accessible from the PSMCU processor 230. | ACCESS = PCI TYPE = PCI TRF = 0 |

TABLE 4

FSM Transition Table

| Transition Number | Initial State | Final State | Cause | Actions |
|---|---|---|---|---|
| 1.1 | Host Power Off | General Loader | Host power applied to the card | PSMCU sets ACCESS = LOADER TYPE = GENERAL |

TABLE 4-continued

FSM Transition Table

| Transition Number | Initial State | Final State | Cause | Actions |
|---|---|---|---|---|
| 1.2 | General Loader | NSP No Association | Host system sends "go" command. | PSMCU sets ACCESS = NSP TYPE = NSP |
| 1.3 | General Loader | PCI No Association | Host system sends "go-pci" command. | PSMCU sets ACCESS = PCI TYPE = PCI |
| 1.4 | General Loader | FIPS No Association | Host system sends "go-fips" command | PSMCU sets ACCESS = FIPS TYPE = FIPS |
| 1.5 | Loader Mode | Host Power Off | Host power removed from unit | None - unit off |
| 3.1 | Host Power Off - PCI | PCI Loader | Host Power applied to the card | PSMCU sets ACCESS = Loader |
| 3.2 | PCI Loader | PCI Processing | Host system sends "go-pci" command and association key exists | PSMCU verifies that TYPE = PCI, then sets ACCESS = PCI |
| 3.3 | PCI Loader | PCI Loader | Card reset received | Loader code restarts, all PSMCU variables unchanged. |
| 3.4 | PCI Loader | Host Power Off - PCI | Host power removed from unit | None - unit off |
| 3.5 | PCI Loader | PCI Factory State | Host system sends "go-pci" command and association key does not exist | PSMCU verifies that TYPE = PCI, then sets ACCESS = PCI |
| 3.6 | Pre-PCI Factory State | PCI Processing | Generate or Load Association Key (Dual control operation) | Personality sets TRF = 0. Association Key and security policy stored. |
| 3.7 | PCI Reset | Host Power Off - PCI | Host power removed from unit | None - unit off |
| 3.8 | PCI Processing | Pre-PCI Factory State | Dual control reset to factory state. | Personality erases all user keys and sets TRF = 1 |
| 3.9 | PCI Processing | PCI Reset | Card reset received | Loader restarts with PSMCU variables unchanged. Non-operable state detected so automatic reboot triggered. |
| 3.10 | PCI Processing | Host Power Off - PCI | Host power removed from unit | None - unit off |
| 3.11 | Pre-PCI Reset | Host Power Off - TRF | Host Power removed from unit | None - unit off |
| 3.12 | Pre-PCI Factory State | Pre-PCI Reset | Card reset received | Loader restarts with PSMCU variables unchanged. Non-operable state detected so automatic reboot triggered. |
| 3.13 | Pre-PCI Factory State | Host Power Off - TRF | Host power removed from unit | None - unit off |

TABLE 4-continued

FSM Transition Table

| Transition Number | Initial State | Final State | Cause | Actions |
|---|---|---|---|---|
| 3.14 | PCI Factory State | Host Power Off - PCI | Host power removed from unit | None - unit off |
| 3.15 | PCI Factory State | PCI Processing | Generate or Load Association Key (Dual control operation) | Personality sets Association Key and security policy stored. |
| 3.16 | PCI Factory State | PCI Reset | Card reset received | Loader restarts with PSMCU variables unchanged. Non-operable state detected so automatic reboot triggered. |
| 3.17 | PCI Processing | PCI Factory State | Single control reset to factory state command received. | Personality erases all user keys but leaves TRF = 0. |

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a security enclosure;
a main processor housed in the security enclosure; and
a physical security monitoring control unit (PSMCU) processor housed in the security enclosure, the PSMCU processor being caused to:
in response to a request from an application to access one of a plurality of cryptographic keys stored in the apparatus, identify a security level associated with the application, and
select one of the plurality of cryptographic keys based on the identified security level associated with the application, each of the plurality of cryptographic keys providing access to a different security mode of operation of the apparatus,
wherein the plurality of cryptographic keys include a first cryptographic key and a second cryptographic key, and
wherein the PSMCU processor is to cause the apparatus to switchably operate between a first mode of operation and a second mode of operation, wherein, in the first mode of operation, the PSMCU processor allows access by the main processor to the first cryptographic key while preventing access by the main processor to the second cryptographic key, and in the second mode of operation, the PSMCU processor allows access by the main processor to the second cryptographic key while preventing access by the main processor to the first cryptographic key.

2. The apparatus of claim 1, wherein the PSMCU processor is further to:
monitor a physical security perimeter of the security enclosure; and
erase the first cryptographic key and the second cryptographic key based on a determination that a tamper has occurred on the security enclosure.

3. The apparatus of claim 1, wherein, following an initial start of the apparatus to enable access to the apparatus by an application associated with a certain security level, the main processor is to reset and start a secure loader, the PSMCU processor is to provide one of the first cryptographic key and the second cryptographic key to the secure loader based on the certain security level associated with the application, and the secure loader is to use the provided first cryptographic key or the provided second cryptographic key to validate an integrity of a code image of the application that the secure loader is to load.

4. The apparatus of claim 3, wherein the certain security level corresponds to one of the first mode of operation or the second mode of operation,
wherein the PSMCU processor is to allow the application access to a first set of cryptographic keys corresponding to the first mode of operation based on the certain security level corresponding to the first mode of operation while preventing access by the application to a second set of cryptographic keys corresponding to the second mode of operation; and
wherein the PSMCU processor is to allow the application access to the second set of cryptographic keys corresponding to the second mode of operation based on the certain security level corresponding to the second mode of operation while preventing access by the application to the first set of cryptographic keys.

5. The apparatus of claim 1, wherein the first mode of operation comprises a mode in which operations of the apparatus are compliant with a payment card industry hardware security module (PCI-HSM) regulations and the second mode of operation comprises a mode in which operations of the apparatus are not compliant with the PCI-HSM regulations.

6. The apparatus of claim 1, wherein the PSMCU processor is further to cause the apparatus to switchably operate between the first mode of operation, the second mode of operation, and a third mode of operation, wherein the first mode of operation comprises a mode in which operations of the apparatus are compliant with a payment card industry hardware security module (PCI-HSM) regulations, the second mode of operation comprises a mode in which operations of the apparatus are compliant with general security regulations, and the third mode of operation comprises a mode in which operations of the apparatus are compliant with federal information processing standards.

7. The apparatus of claim 1, wherein, when the apparatus is in the first mode of operation, the PSMCU processor is further to cause the apparatus to remain in the first mode of operation following a power cycle of the apparatus.

8. The apparatus of claim 1, wherein, when the apparatus is in the first mode of operation, the PSMCU processor is further to cause the apparatus to prevent exit from the first mode of operation until and unless the PSMCU processor receives approval from at least two authorized operators to exit from the first mode of operation.

9. A method comprising:
receiving, by a security apparatus, a request from an application associated with a security level to access a cryptographic key stored in the security apparatus;
identifying, by the securing apparatus, the security level to which the application is associated;
selecting, by the security apparatus, one of a plurality of cryptographic keys based on the identified security level associated with the application, each cryptographic key of the plurality of keys providing access to a different security mode of operation of the security apparatus;
implementing the selected cryptographic key to validate an integrity of a code image of the application that the security apparatus is to load; and
one of:
based on the integrity of the code image being validated, allowing the application access to the security mode of operation corresponding to the identified security level; or
based on the integrity of the code image not being validated, denying the application access to the security mode of operation corresponding to the identified security level.

10. The method of claim 9, wherein the security mode of operation accessed by the application is a security mode of a plurality of security modes, wherein the plurality of security modes comprises a first mode in which the security apparatus is to exit from the first mode following receipt of approvals from at least two authorized operators to exit from the first mode and a second mode in which the security apparatus is to exit from the second mode without receiving approval from at least two authorized operators.

11. The method of claim 10, further comprising:
following a detection that the security apparatus has undergone a power cycle and based on the integrity of the code image being validated and the security mode of operation accessed by the application comprising the first mode, remaining in the first mode without restarting a secure loader code.

12. The method of claim 10, further comprising:
allowing the application access to a first set of cryptographic keys corresponding to the first mode based on the identified security level corresponding to the first mode while preventing access by the application to a second set of cryptographic keys corresponding to the second mode; and
allowing the application access to the second set of cryptographic keys corresponding to the second mode based on the identified security level corresponding to the second mode while preventing access by the application to the first set of cryptographic keys.

13. The method of claim 10, wherein the selected cryptographic key is associated with the first mode, said method further comprising:
receiving an instruction to exit the first mode;
determining whether approval from at least two authorized operators to exit from the first mode has been received;
based on a determination that approval from at least two authorized operators to exit from the first mode has not been received, remain in the first mode following receipt of the instruction to exit the first mode; and
based on a determination that approval from at least two authorized operators to exit from the first mode has been received, exit from the first mode.

14. The method of claim 9, wherein the security mode of operation accessed by the application is one security mode of a plurality of security modes, wherein the plurality of security modes comprises a first mode in which operations of the security apparatus are compliant with payment card industry hardware security module (PCI-HSM) regulations, a second mode in which operations of the security apparatus are not compliant with the PCI-HSM regulations, and a third mode in which operations of the security apparatus are compliant with federal information processing standards.

15. The method of claim 9, further comprising:
monitoring a physical security perimeter of the security apparatus; and
based on a determination that a tamper has occurred on the security apparatus, erasing the plurality of cryptographic keys.

16. A non-transitory computer readable medium storing machine readable instructions that, when executed by a processor, cause the processor to:
receive a request from an application to access a security mode of a plurality of security modes of operation of a security apparatus, each of the plurality of security modes having a corresponding cryptographic key;
identify a security level associated with the application;
select one of a plurality of cryptographic keys based on the security level associated with the application, each cryptographic key of the plurality of cryptographic keys providing access to a different security mode of the plurality of security modes of operation of the security apparatus;
identify one of the plurality of security modes of operation of the security apparatus corresponding to the selected cryptographic key;
implement the selected cryptographic key corresponding to the identified security mode of operation to validate an integrity of the application; and
based on the integrity of the application being validated, allow the application to access the identified security mode of operation of the security apparatus.

17. The non-transitory computer readable medium of claim 16, wherein the plurality of security modes of operation comprises a first mode in which the security apparatus is to exit from the first mode following receipt of approvals from at least two authorized operators to exit from the first mode and a second mode in which the security apparatus is to exit from the second mode without receiving approval from at least two authorized operators.

18. The non-transitory computer readable medium of claim 17, wherein the instructions are further to cause the processor to detect that the security apparatus has undergone a power cycle and based on the integrity of the application being validated and the identified security mode of operation comprising the first mode, to remain in the first mode without restarting a secure loader code.

19. The non-transitory computer readable medium of claim 17, wherein the instructions are further to cause the processor to:
    allow the application access to a first set of cryptographic keys corresponding to the first mode based on the identified security level corresponding to the first mode while preventing access by the application to a second set of cryptographic keys corresponding to the second mode; and
    allow the application access to the second set of cryptographic keys corresponding to the second mode based on the identified security level corresponding to the second mode while preventing access by the application to the first set of cryptographic keys.

20. The non-transitory computer readable medium of claim 16, wherein the instructions are further to cause the processor to:
    monitor a physical security perimeter of the security apparatus; and
    based on a determination that a tamper has occurred on the security apparatus, erase the plurality of cryptographic keys.

* * * * *